United States Patent
Munenaga et al.

(10) Patent No.: US 7,129,001 B2
(45) Date of Patent: Oct. 31, 2006

(54) CELL COMPRISING A POWER-GENERATING ELEMENT FASTENED BY SHEETS

(75) Inventors: Noriyoshi Munenaga, Kyoto (JP); Takeshi Shimozono, Kyoto (JP); Hiroshi Tasai, Kyoto (JP); Isao Suzuki, Kyoto (JP)

(73) Assignee: GS Yuasa Corporation, Kyoto (JP)

( * ) Notice: Subject to any disclaimer, the term of this patent is extended or adjusted under 35 U.S.C. 154(b) by 393 days.

(21) Appl. No.: 10/320,663

(22) Filed: Dec. 17, 2002

(65) Prior Publication Data

US 2003/0129479 A1    Jul. 10, 2003

(30) Foreign Application Priority Data

Dec. 18, 2001  (JP) .............................. 2001-383916
May 28, 2002  (JP) .............................. 2002-153787
May 30, 2002  (JP) .............................. 2002-158202

(51) Int. Cl.
*H01M 2/02* (2006.01)

(52) U.S. Cl. ........................................ 429/152; 429/94
(58) Field of Classification Search .................. 429/56, 429/94, 152, 153, 157
See application file for complete search history.

(56) References Cited

U.S. PATENT DOCUMENTS 5,478,668 A * 12/1995 Gozdz et al. ............... 429/127
5,556,722 A * 9/1996 Narukawa et al. .......... 429/163
6,258,478 B1 * 7/2001 Kim ............................ 429/60
6,440,604 B1 * 8/2002 Inoue et al. ................ 429/211
6,544,684 B1 * 4/2003 Onishi et al. ............... 429/146
6,589,690 B1 * 7/2003 Sato et al. .................. 429/162
6,627,343 B1 * 9/2003 Kim et al. ................... 429/94
6,797,429 B1 * 9/2004 Komatsu .................... 429/163

FOREIGN PATENT DOCUMENTS

| JP | 2000-223109 | 8/2000 |
| JP | 2002-93402 | 3/2002 |
| JP | 2002-100341 | 4/2002 |
| JP | 2002-231214 | 8/2002 |
| JP | 2002-231297 | 8/2002 |

* cited by examiner

*Primary Examiner*—Mark Ruthkosky
(74) *Attorney, Agent, or Firm*—Wenderoth, Lind & Ponack, L.L.P.

(57) ABSTRACT

A cell such as a nonaqueous electrolytic secondary cell includes a plurality of power-generating elements which each include a strip-like positive electrode and a strip-like negative electrode that are both wound into an elliptic cylinder with a separator being interposed therebetween, where each power-generating element has a peripheral face including at least a flat portion. The cell also includes a cell case for housing the power-generating elements, where the cell case has an opening, and a cover hermetically sealing the opening of the cell case. The flat portion of each power-generating element is superposed on the flat portion of the adjacent power-generating element, and a sheet member is wound around peripheries of the superposed power-generating elements to fasten the power-generating elements such that the power-generating elements are integrated.

6 Claims, 10 Drawing Sheets ized and houses into a cell case. In the nonaqueous
CELL COMPRISING A POWER-GENERATING ELEMENT FASTENED BY SHEETS

BACKGROUND OF THE INVENTION

1. Field of the Invention

The present invention relates to a cell comprising a plurality of generally elliptic cylindrical wound generating elements, such as a nonaqueous electrolytic secondary cell.

2. Description of the Related Art

In conventional prismatic cells of large discharge capacity, e.g. a nonaqueous electrolytic secondary cell, a plurality of elliptic cylindrical wound power-generating elements are superposed and housed into a cell case. In the nonaqueous electrolytic secondary cell, as shown in FIG. 9, four elliptic cylindrical wound power-generating elements 3 have respective peripheral flat side faces superposed on one another and are housed into a cell case 1. FIG. 10 illustrates a connecting structure of the power-generating elements 3 and current collectors 4. The illustrated nonaqueous electrolytic secondary cell comprises four elliptic cylindrical wound power-generating elements 3 which are connected in parallel to one another. Each power-generating element 3 includes a strip-like positive electrode and a strip-like negative electrode which are both wound into the shape of an elliptic cylindrical winding with a separator interposed therebetween. The positive electrode is made of a strip-like aluminum foil having a surface on which a positive active material is carried, whereas the negative electrode is made of a strip-like copper foil having a surface on which a negative active material is carried.

The active material is applied to a substrate of each electrode except for at least one of the edges thereof. The power-generating element 3 is wound so that a portion of the positive electrode to which the active material is applied is substantially opposed to a portion of the negative electrode to which the active material is applied with the separator 3c being interposed therebetween. The active material is not applied to a substrate edge 3a' of the positive electrode, and the active material is not applied to a substrate edge 3b' of the negative electrode. The substrate edges 3a' and 3b' are disposed so as to be opposed to each other with the opposed active-material-applied portions being interposed therebetween.

The active-material-applied face of the negative electrode 3b is disposed on an outer peripheral side face of the wound power-generating element 3, or another substrate of the positive or negative electrode 3a or 3b is wound on the peripheral side face of the wound power-generating element 3 once, or only another separator is wound on the peripheral side face of the wound power-generating element 3. A tape made from polypropylene resin is applied to an end of the wound power-generating element 3 so that the power-generating element is maintained in a wound state.

In the power-generating element 3 of the elliptic cylindrical wound type, each of the substrate edges 3a' and 3b' comprises arc portions that are curved and overlapped, and a flat overlapped straight portion. Two current collectors 4 are connected to the straight portions of the substrate edges 3a' and 3b', respectively. Each current collector 4 includes recesses of corrugated electrode-connecting portions 4b. The substrate edges 3a' and 3b' are put into the recesses to be welded as shown in FIG. 9, thereby serving as leads connecting the positive and negative plates to the positive and negative terminals, respectively. An aluminum alloy plate is usually used as the current collector 4 connected to the substrate edge 3a' of the positive electrode, whereas a copper alloy plate is usually used as the current collector 4 connected to the substrate edge 3b' of the negative electrode.

The power-generating element 3 including two current collectors 4 connected as described above is inserted into a casing-like stainless-steel cell case 1 from above and an upper open end of the case 1 is closed by a cover plate (not shown), as shown in FIG. 9. A periphery of the cover plate is welded to the case 1 thereby to seal the case. A predetermined amount of electrolyte is poured through a filler hole into the interior of the case 1. The filler hole is thereafter closed, whereupon a nonaqueous electrolytic secondary cell is thus provided. The positive and negative terminals 4b and 5b of the respective collector tabs 4 and 5 extend through the cover plate while being insulated from the cover plate.

In the cell comprising the elliptic cylindrical wound power-generating elements 3, however, the peripheral flat portion of each power-generating element 3 is gradually curved to be expanded with repeated charge and discharge, whereupon each power-generating element 3 tends to change from the elliptic cylindrical shape to a cylindrical shape. When the power-generating element 3 is thus deformed, a distance between the wound positive and negative electrodes is increased such that the performance of the cell is reduced. Furthermore, the expansion of the peripheral flat portion of the power-generating element 3 also forces the cell case 1 to expand.

Furthermore, the active material applied to an outermost negative electrode may come into contact with an inner surface of the cell case 1 to fall off when each power-generating element 3 is put into the case. Additionally, even where the separator is wound around an outermost peripheral face of the power-generating element 3, the separator may be damaged when the power-generating element 3 is housed into the case, whereupon an active material applied to inner electrodes may fall off.

Furthermore, pieces of the active material that have fallen off move in the cell case 1 during use of the cell, resulting in a tiny short circuit between the positive and negative electrodes. The discharge capacity of the cell reduces rapidly since discharge of a feeble current continuously takes place at a short-circuit portion upon occurrence of such a tiny short circuit. This poses a problem.

The substrate edges 3a' and 3b' of the arc portion of the power-generating element 3 come into contact with the inner face of the cell case 1 to be bent when the elliptic cylindrical wound power-generating element 3 is accommodated in the cell case 1. In this case, the current collector is sometimes broken and falls off. Further, when an impact force is applied to the substrate edges 3a' and 3b', the active material sometimes falls off from the electrode part that is located in the vicinity of the substrate edges 3a' and 3b'. In this case, too, broken pieces of the substrate and fallen pieces of the active substance may adhere to the positive or negative electrode, resulting in a tiny short circuit.

When the power-generating element 3 is manufactured, as typically shown in FIG. 10, the separators 3c are wound on a core 9 by a half turn or one turn while being pressed by a pair of rollers 10, and thereafter, the positive and negative electrodes 3a and 3b are wound onto the respective separators 3c together with the separators 3c. Thus, the positive and negative electrodes 3a and 3b are overlapped with the separators 3c being interposed therebetween thereby to be wound on the core 9 having an elliptic cylindrical section. The core 9 is made of a resin having high electrolyte resistance, e.g. polyethylene terephthalate (PET).

A relatively large clamping force is applied to an arc portion S (see FIG. 7) of the power-generating element 3 manufactured as described above such that the positive and negative electrodes 3a and 3b and separators 3c are dense. On the contrary, the positive and negative electrodes 3a and 3b and separators 3c are sparse in a straight portion Q. Accordingly, the electrolyte is hard to permeate into the arc portion S. Particularly when the separator is excessively pressed such that porosity thereof is reduced, each separator 3c cannot reserve a sufficient amount of electrolyte. This adversely affects the charge and discharge characteristics of the cell, resulting in variations in the characteristics between the power-generating elements 3 and between the cells.

On the other hand, when the clamping force is excessively small, an interelectrode distance becomes unstable, whereupon the charge and discharge characteristics vary among power-generating elements and among cells. Accordingly, in the cell including the elliptic cylindrical wound generating elements, it is important that the interelectrode distance between the positive and negative electrodes should not become unstable in the straight portion where the electrodes and separators are wound by a relatively small force, and that the electrolyte should be maintained in the separators sufficiently and homogeneously.

Reference symbol d designates a major axis of a cross-sectional ellipse in the power-generating element 3, and reference symbol w designates a minor axis thickness of a cross-sectional ellipse in the power-generating element 3. When the value of (d−w) is large, the distance between the positive and negative electrodes is increased in a central flat portion of the peripheral face of the power-generating element 3 even if the peripheral face of the power-generating element 3 is fastened tight by a sheet member. Accordingly, the value of (d−w) is required to be within a proper range.

SUMMARY OF THE INVENTION

Therefore, an object of the present invention is to provide a cell in which the interelectrode distance between the positive and negative electrodes is maintained at a constant value such that the cell can be prevented from swelling, in which the electrolyte can be maintained in the separators homogeneously so that the variations in the charge and discharge characteristics between the power-generating elements or between the cells and the falling-off of the active material and breakage of the substrates can be prevented so that reduction in the cell capacity and service life of the cell is restrained.

The present invention provides a cell comprising a plurality of power-generating elements which each include a strip-like positive electrode and a strip-like negative electrode that are both wound into an elliptic cylinder with a separator being interposed therebetween, where each power-generating element has a peripheral face including at least a flat portion. The cell also comprises a cell case for housing the power-generating elements, where the cell case has an opening, and a cover hermetically sealing the opening of the cell case. In the cell, the flat portion of each power-generating element is superposed on the flat portion of the adjacent power-generating element, and a sheet member is wound around peripheries of the superposed power-generating elements to fasten the power-generating elements such that the power-generating elements are integrated.

A plurality of the power-generating elements are superposed on each other or one another and are banded by the sheet member covering them. Accordingly, since the peripheral flat portions of the power-generating elements are pressed against each other or one another, the peripheral flat portions can be restrained from expansion. Consequently, an increase in the interelectrode distance between the positive and negative electrodes can be prevented in each power-generating element, deformation of each power-generating element into the cylindrical shape can be prevented, and the cell case can be prevented from expansion.

In a preferred form, current collectors are connected to the substrate edges of the positive and negative electrodes of each power-generating element, and the elliptic substrate edge of the positive and/or negative electrode includes a part thereof including at least an arc portion that is bent so as to be close with a central winding axis. The bent portion may include a straight portion that is connected to the current collector.

The substrate edges are bent inside so as to adhere closely to each other, whereupon the cell can be prevented from deformation. Further, the substrate edges can be prevented from damage when the power-generating elements are housed into the cell case. Additionally, the substrates and active materials on the positive and negative electrodes can be prevented from breakage and falling-off.

An a foresaid angle of bend of each electrode is preferably at 5° or above. The reason for this is that the bend angle of at least 5° is required in order that the adjacent substrates may reliably adhere closely to each other.

In order that electrolyte may be maintained in the separator homogeneously, the following relationship is met:

$$w/4 \leq d-w \leq 10w,$$

where d is a major axis of a cross-sectional ellipse in the power-generating element, and w is a minor axis of a cross-sectional ellipse in the power-generating element.

The positive and negative electrodes and separator are wound around the core having an elliptic cylindrical section. Even when the winding is banded tightly over the arc portion such that the electrodes and separator are dense, the electrolyte maintained in the straight portion is permeated into the arc portion so that a sufficient amount of electrolyte can be maintained in the arc portion.

Furthermore, even in the case where the power-generating element is banded by the sheet member when the value of (d−w) is large, the interelectrode distance between the positive and negative electrodes is increased in the central flat portion of the periphery of the power-generating element. Accordingly, it is important to maintain the value of (d−w) within the above-described range.

BRIEF DESCRIPTION OF THE DRAWINGS

Other objects, features and advantages of the present invention will become clear upon review of the following description of the embodiments of the present invention, made with reference to the accompanying drawings, in which.

DETAILED DESCRIPTION OF THE INVENTION

First Embodiment

Figure 1:
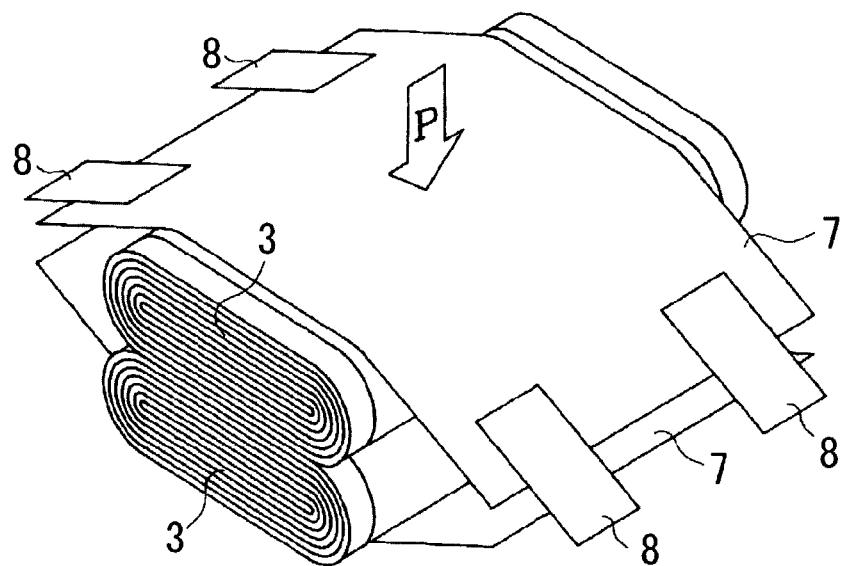
FIG. 1 is a perspective view of two power-generating elements used in a cell in accordance with a first embodiment of the present invention, showing a step of covering the power-generating elements with a sheet member and banding the elements with a tape having an adhesive material.
Figure 10:
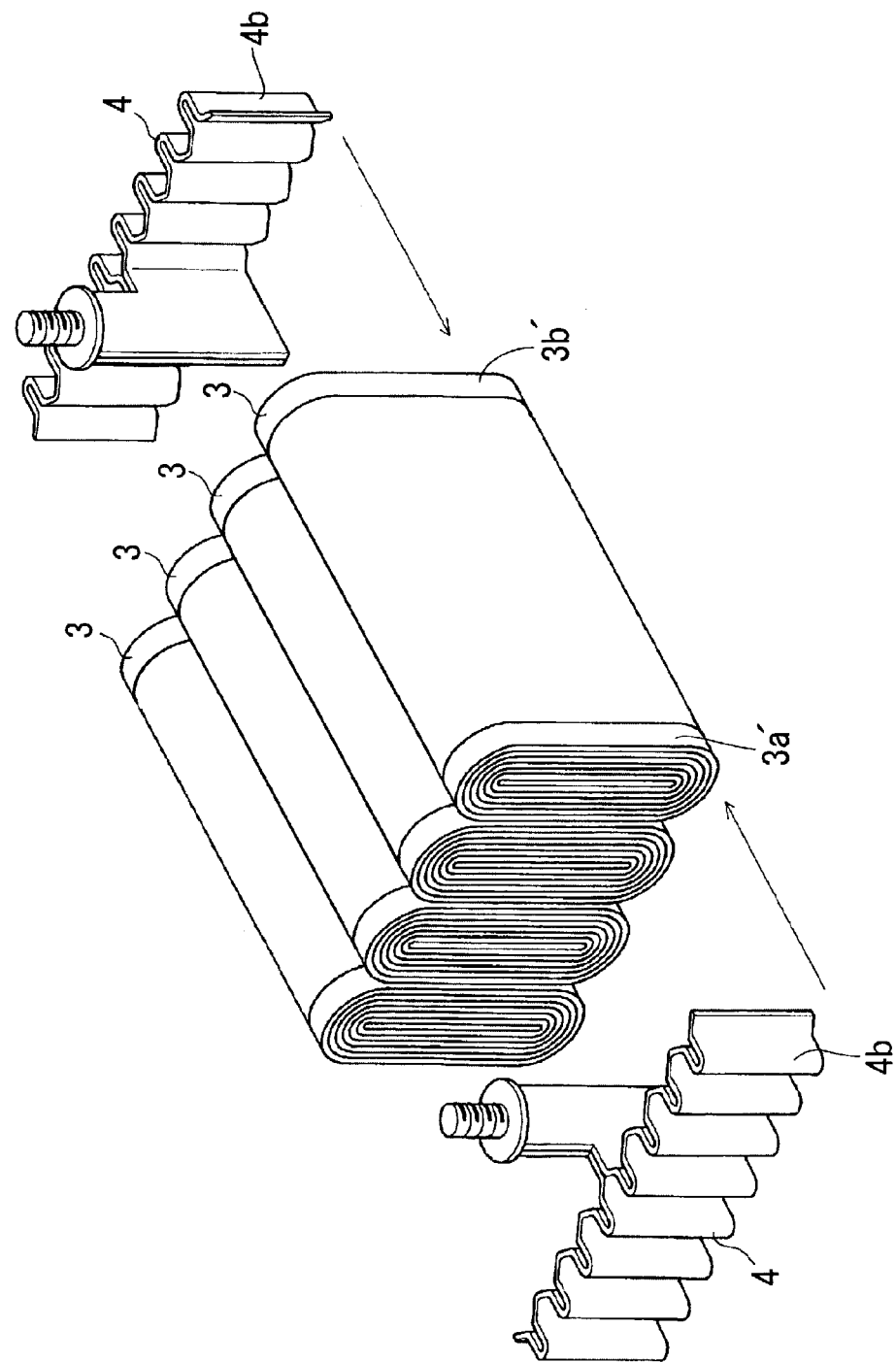
FIG. 10 is a perspective view showing a manner of assembling the power-generating elements and current collectors in the conventional nonaqueous electrolytic secondary cell.

A first embodiment of the present invention will be described with reference to FIGS. 1 to 3. In the first embodiment, the present invention is applied to a large-scale nonaqueous electrolytic secondary cell. The cell comprises four generally elliptic cylindrical wound power-generating elements 3 as in the conventional cell shown in FIGS. 10 and 11. Each power-generating element 3 has a flat peripheral side face superposed on one of the adjacent element and is housed in a cell case 1. The power-generating elements 3 include positive electrodes 3a and negative electrodes 3b which are connected via current collectors 4 to positive terminals 6a and negative terminals 6b, respectively.

Figure 11:
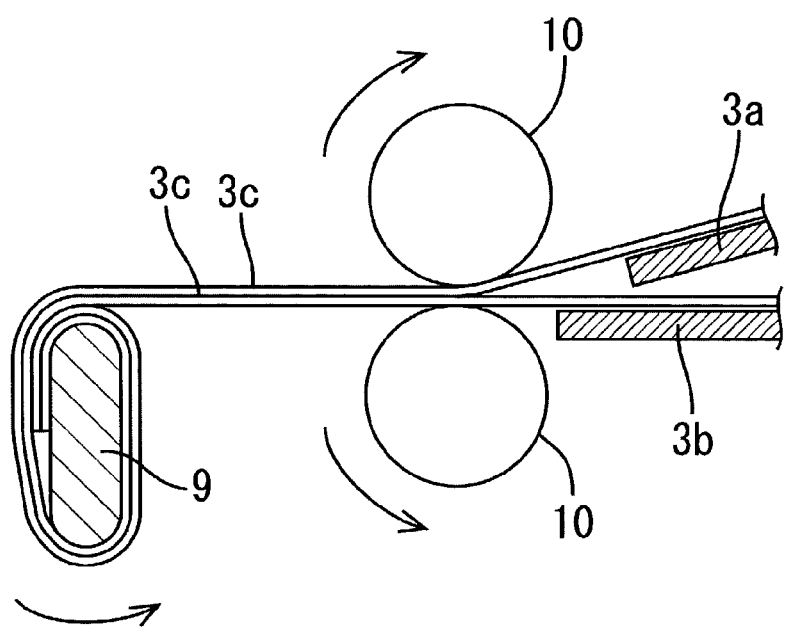
FIG. 11 is a typical sectional view of the power-generating element in which the positive and negative electrodes are wound with the separator being interposed therebetween.

A strip-like positive electrode 3a and negative electrode 3b are wound into the shape of an elliptic cylinder with a separator 3c being interposed therebetween, as shown in FIG. 11. The positive electrode 3a includes a strip-like aluminum foil serving as a substrate. The aluminum foil has a surface carrying a positive active material except for one of the ends of the aluminum foil. The negative electrode 3b includes a strip-like copper foil serving as a substrate. The copper foil has a surface carrying a negative active material except for one of the ends of the copper foil.

The wound positive and negative electrodes 3a and 3b are displaced slightly toward the winding axis relative to each other so that the positive active material and negative active material are generally opposed to each other with the separator 3c being interposed therebetween. As a result, a portion of the aluminum foil in the positive electrode 3a, to which portion no positive active material is applied, is located at one of the ends of the power-generating element 3. The portion of the positive electrode 3a serves as a positive substrate edge 3a'. A portion of the copper foil in the negative electrode 3b, to which portion no negative active material is applied, is located at the other end of the power-generating element 3. The portion of the negative electrode 3b serves as a negative substrate edge 3b'.

The aforesaid four power-generating elements 3 are arranged with a peripheral flat portion of each element being superposed on a peripheral flat portion of the adjacent element. In this case, as shown in FIG. 1, peripheral side faces of two power-generating elements 3 are covered with two sheet members 7, and the sheet members 7 are joined by an adhesive tape 8 with an adhesive. More specifically, two power-generating elements 3 are placed on one of the sheet members 7 with a flat peripheral portion of one element being superposed on a flat peripheral portion of the other element, as shown in FIG. 1. The other sheet member 7 is placed on the power-generating elements 3 so as to be opposed to the previously placed sheet member 7, as shown in FIG. 1. The sheet members 7 and accordingly the flat portions of the power-generating elements 3 are pressed by a pressing machine (not shown) or the like in a direction of arrow P in FIG. 1. In a pressed state, the upper and lower sheet members 7 are stretched outwards so as to extend over both outer side faces of the power-generating elements 3. The adhesive tape 8 is applied to both ends of the power-generating elements 3 so that both ends of one sheet member 7 are joined to both ends of the other sheet member 7, respectively. Thus, the sheet members 7 cover the peripheral side faces of the power-generating elements 3, and the adhesive tape 8 is applied so that the power-generating elements 3 are bound tight.

Figure 2:
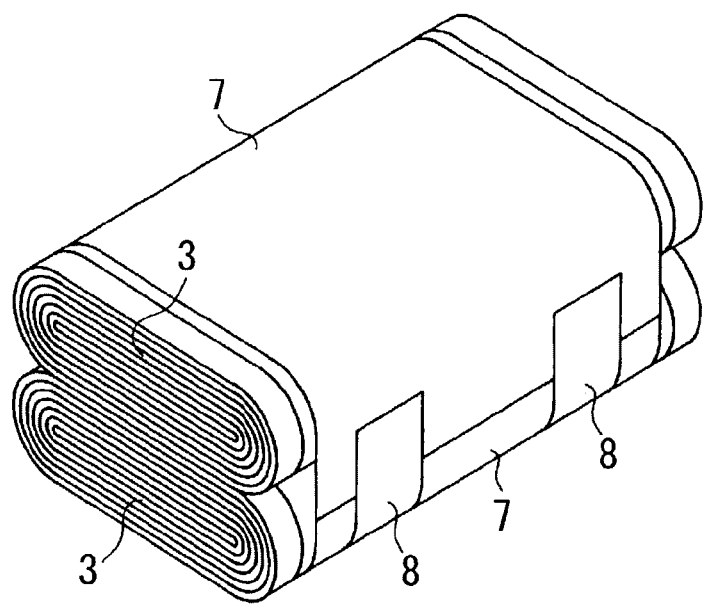
FIG. 2 is a perspective of the power-generating elements covered with the sheet member and banded with the tape.

The power-generating elements 3 are bound tight by the sheet members 7 with the flat peripheral portions being superposed, as shown in FIG. 2. Accordingly, the power-generating elements 3 remain in the pressed state even after they are released from the vertical pressure by the pressing machine or the like. This can maintain a homogeneous interelectrode distance between the positive and negative electrodes in a straight portion of the power-generating element where the interelectrode distance tends to easily become unstable, thereby preventing variations in the charge and discharge characteristics between the power-generating elements or cells. Two power-generating elements 3 are bound by the sheet members 7 with the peripheral flat portions of the elements being superposed, as shown in FIGS. 1 and 2. However, four power-generating elements 3 may instead be simultaneously bound by the sheet members 7.

Furthermore, it is desirable that each sheet member 7 has a width that is substantially equal to a width of the portion of the outermost electrode to which the active material is applied or a width of the separator 3c, although the width of each sheet member is shorter than that of the active material portion or separator 3c. Consequently, the outer peripheral faces of the power-generating elements are covered with the sheet members 7, whereupon the active material on the outermost electrode can be prevented from falling off when the power-generating elements are housed in the cell case 1. Further, when the outermost layer of the power-generating element 3 is the separator 3c, the separator 3c can be prevented from breakage and the active material on the outermost electrode can be prevented from falling off.

Each sheet member 7 is made from polyphenyl-sulfite resin (PPS), and the adhesive tape 8 is a polyphenyl-sulfite sheet having one side to which an adhesive is applied. However, the materials for the sheet member 7 and adhesive tape 8 should not be limited to those noted above. Any ductile sheet member having high electrolytic resistance and heat resistance may be used. For example, a polypropylene or polyimide resin may instead be used as the materials for the sheet member 7 and adhesive tape 8. Further, cloth, unwoven cloth or paper may be used other than a resin.

Further, an adhesive or bonding agent may be applied to the sheet member 7 instead of the adhesive tape 8. Additionally, the sheet members 7 may be directly secured together by heat welding or the like.

Figure 3:
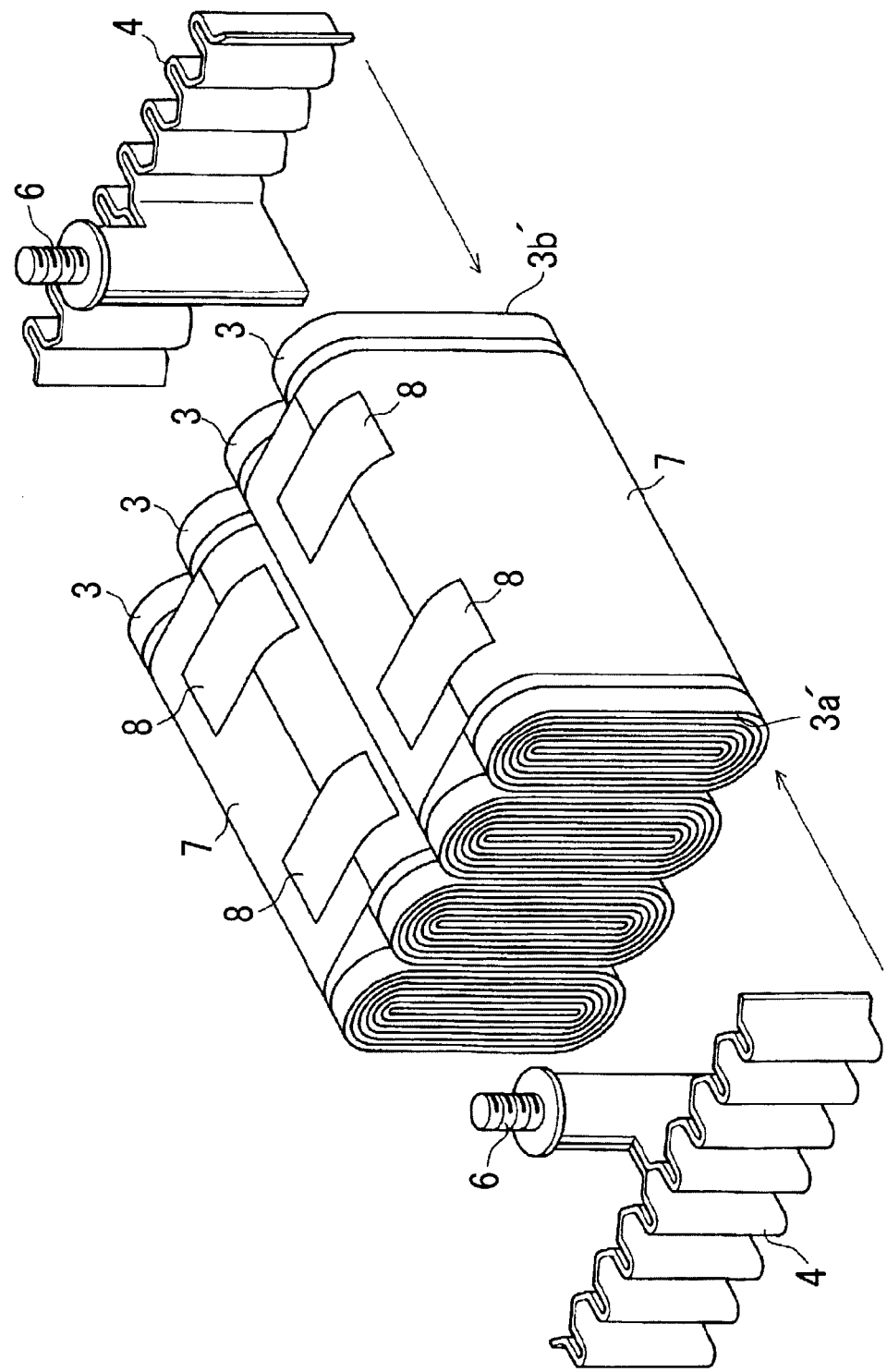
FIG. 3 is a perspective view showing a manner of connecting current collectors to the power-generating element.

Referring now to FIG. 3, the nonaqueous electrolytic secondary cell of the foregoing embodiment comprises two pairs of power-generating elements 3, where each pair includes two power-generating elements that are bounded by the sheet members 7. A peripheral flat portion of each power-generating element is superposed on a peripheral flat portion of the adjacent power-generating element. Two current collectors 4 are connected to opposite ends of the superposed elements 3, respectively. Each current collector 4 has a terminal 6 that is connected to a central upper end of a corrugated plate. The positive substrate edge 3a' located at one end of the power-generating elements 3 are fitted into recesses of the corrugation of the positive current collector 4 to be connected by ultrasonic welding. As a result, the parallel-connected positive electrodes 3a of the four power-generating elements 3 are connected to the positive terminal 6. Further, the negative substrate edge 3b' located at the other end of the power-generating elements 3 are fitted into recesses of the corrugation of the negative current collector 4 to be connected by ultrasonic welding, whereby the parallel-connected negative electrodes 3b of the four power-generating elements 3 are connected to the negative terminal 6.

The four power-generating elements 3 connected via the current collectors 4 to the positive and negative terminals 6 are housed into a box-like metal cell case 1. An upper open end of the cell case 1 is then closed by a cover (not shown). Upper ends of the positive and negative terminals 6 extend through holes (not shown) of the cover with an insulating sealer (not shown) filling the holes, protruding outward. The interior of the cell case 1 is then filled with a predetermined amount of nonaqueous electrolyte and closed, whereby the nonaqueous electrolytic secondary cell is completed.

In the above-described nonaqueous electrolytic secondary cell, two power-generating elements 3 are bound by the sheet members 7 with the peripheral flat faces of the elements being superposed on each other. Consequently, since the flat peripheral faces of the power-generating elements 3 are caused to push each other, each power-generating element 3 can be restrained from deformation from the elliptic cylindrical shape to the cylindrical shape by expansion of the peripheral flat face thereof. Accordingly, the interelectrode distance can be prevented from being increased in each power-generating element 3, whereupon a reduction in the performance of the cell can be prevented. Consequently, since the electrolyte is maintained in the separator homogeneously, variations in the performance between the power-generating elements or the cells can be restrained. Additionally, the cell case 1 can be prevented from being swollen by the power-generating elements 3 housed therein.

Furthermore, the active material that is applied to the outermost negative electrode can be prevented from being brought into contact with the inner surface of the cell case 1 and is thereby prevented from falling off when the power-generating elements 3 are housed into the cell case. Additionally, if the separator 3c is wound on the outermost layer of the power-generating element 3, the separator 3c is prevented from being broken when the power-generating elements 3 are housed into the cell case 1, and therefore, the active material located inside the separator 3c can be prevented from falling off. This can prevent the fallen active material from causing a tiny short-circuit between the positive and negative electrodes and can accordingly prevent an early reduction in the cell capacity and a reduction in the service life of the cell.

Second Embodiment

FIGS. 4 to 8 illustrate a second embodiment of the present invention. In the second embodiment, the present invention is applied to a nonaqueous electrolytic secondary cell having a different current collecting structure from that in the first embodiment, and a metal foil of the electrode projecting from an end face of the power-generating element is bent at an arc portion.

Figure 4:
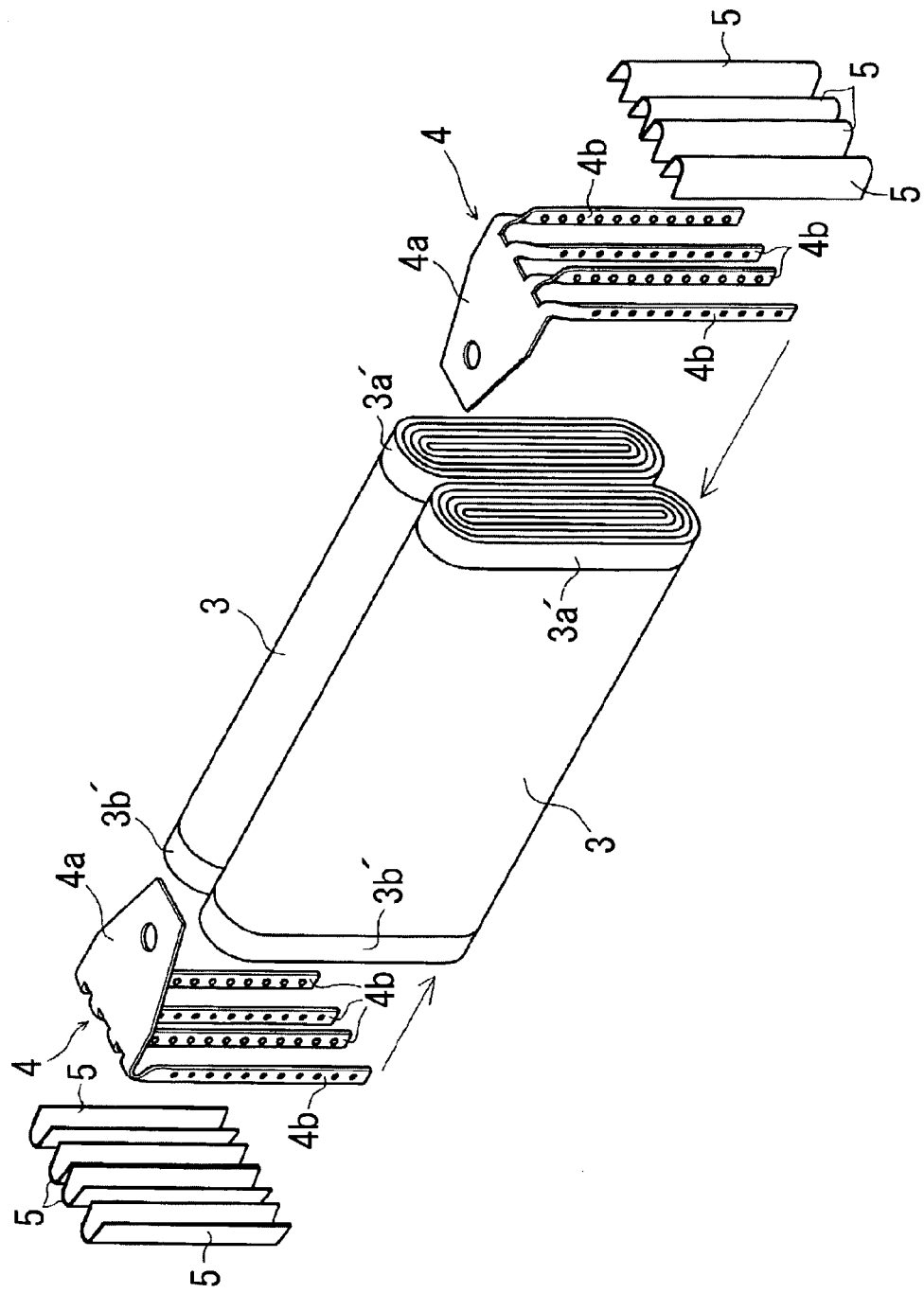
FIG. 4 is a perspective view showing a manner of assembling the power-generating elements and current collectors in accordance with a second embodiment of the present invention.
Figure 5:
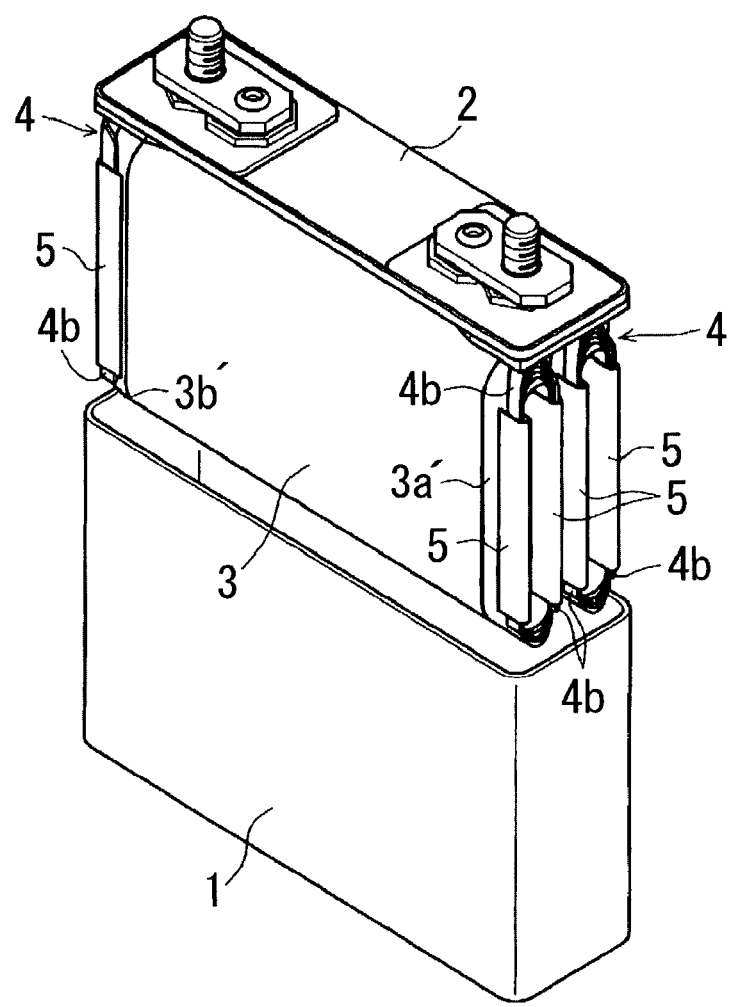
FIG. 5 is a perspective of the structure in which parts such as the current collectors are mounted on the power-generating elements.

FIGS. 4 and 5 illustrate a connecting structure for the power-generating element 3 and current collector 4. The nonaqueous electrolytic secondary cell includes a parallel connection of two elliptic cylindrical power-generating elements 3. Each power-generating element 3 comprises a horizontally disposed, generally trapezoidal collector body 4a and four generally comb-teeth-like slender connecting portions 4b that are diverged downward from a bottom side of the collector body 4a. Each connecting portion 4b includes a plurality of convex portions which are formed at predetermined intervals so as to protrude therefrom. Each current collector 4 is made by stamping an aluminum or copper alloy plate by pressing, and the convex portions are formed on each connecting portion 4b. Each connecting portion 4b is twisted or otherwise bent at its root by 90 degrees relative to the collector body 4a. An adjacent two of the four connecting portions 4b are paired, and one of the connecting portions 4b of each pair is twisted so as to be turned in the opposite direction to the other connecting portion 4b of the pair. As a result, the convex portions of paired connecting portions 4b confront each other.

The current collectors 4 are disposed so that the collector bodies 4a are located over both ends of the power-generating elements 3 and the connecting portions 4b are located along the end faces of the power-generating elements, respectively. The current collector 4 comprising the aluminum alloy plate is disposed at the end face where the positive substrate edge 3a' of the positive electrodes 3a of the power-generating elements 3 are located. The current collector 4 comprising the copper alloy plate is disposed at the end face where the negative substrate edge 3b' of the negative electrodes 3b of the power-generating elements 3 are located. The straight portions of the edges 3a' and 3b' are held between the paired connecting portions 4b and are further connected to be fixed by the holding plates 5, respectively. Each holding plate 5 is made by folding a rectangular metal plate at its center lengthwise. Each holding plate 5 used at the positive electrode 3a side is made of an aluminum alloy plate, whereas each holding plate 5 used at the negative electrode 3b side is made of a copper alloy plate.

An ultrasonic or resistance welding is applied to both sides of each holding plate 5 holding the respective connecting portion 4b and substrate edge 3a' or 3b', whereby the connecting portion 4b and substrate edge 3a' or 3b' are joined together. Each connecting portion 4b has the convex portions formed on the inner side thereof superposed on the substrate edge 3a' or 3b'. Ultrasonic energy or resistive heat is concentrated on the convex portions, whereupon the connecting portion 4b and substrate edge 3a' or 3b' can reliably be joined together.

Figure 6:
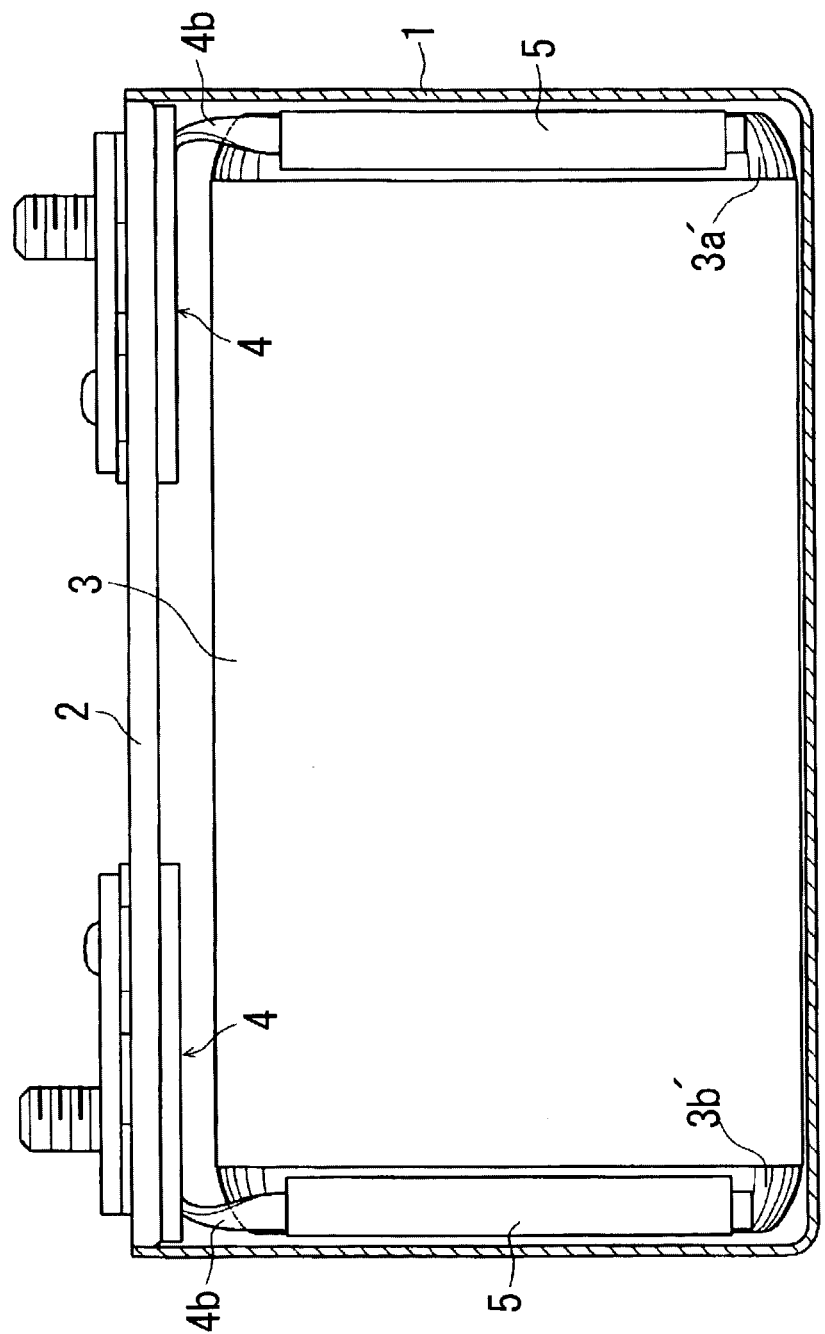
FIG. 6 is a sectional view of a bent substrate exposed portion of the end of the power-generating element.

Referring now to FIG. 6, the nonaqueous electrolytic secondary cell is shown in its longitudinal section. In the second embodiment, the straight portions of the substrate edges 3a' and 3b' are held between the connecting portions 4b and fixed by the holding plates 5, and the arc portions of the substrate edges 3a' and 3b' are bent inward. Accordingly, the substrate edges 3a' or 3b' of each arc portion has a corrugated distal end and is narrowed such that the substrate ends adhere closely to each other.

In the second embodiment, it is preferable that the substrate edges 3a' and 3b' should be bent at an angle of 5 degrees or more. Further, an inclination does need not be constant and the inclination may gradually be increased toward the distal end. In this case, a maximum inclination angle should be at or above 5 degrees. When the angle is small, gaps among arc portions of the wound substrate edge 3a' or 3b' are rendered small. In order that the substrate edges may be caused to reliably adhere closely to one another and strength against deformation may be maintained, the substrate edges 3a' and 3b' need to be bent at least 5 degrees. Bending the substrate edges 3a' and 3b' may be carried out immediately after winding the power-generating element 3 or after mounting to the current collectors 4.

The substrate edges 3a' and 3b' of each power-generating element 3 are bent at the arc portions so as to adhere closely to each other. Accordingly, the substrate edges 3a' and 3b' are not deformed even if the ends collide with a wall of the cell case 1 or are rubbed against an inner face of the cell case 1 when the power-generating elements 3 are housed in the cell case 1. Thus, the active materials are prevented from falling off from the positive and negative electrodes respectively and the current collectors are prevented from being broken. Consequently, a reduction in the cell performance can be prevented from being caused by an internal tiny short circuit between the electrodes further caused by fallen pieces of active material and broken pieces of the current collector.

Figure 7:
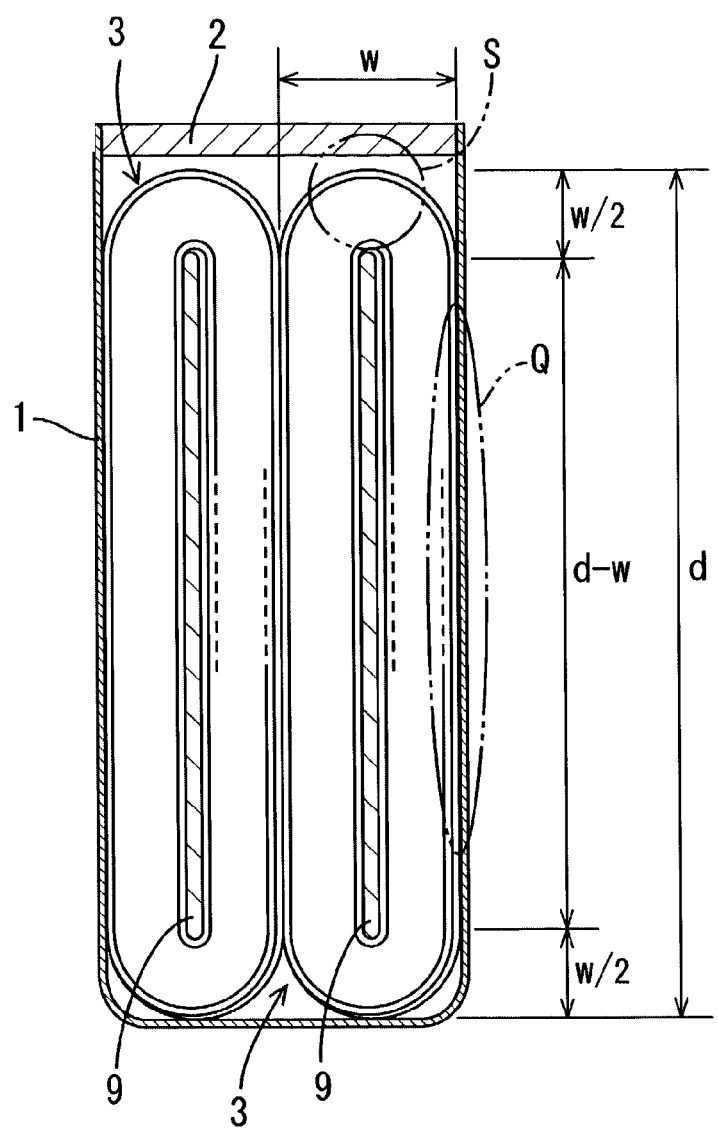
FIG. 7 is a cross sectional view of the cell with the power-generating elements.

FIG. 7 illustrates a section of the nonaqueous electrolytic secondary cell comprising two elliptic cylindrical wound power-generating elements 3 having respective flat peripheral side faces superposed on each other and housed in the cell case 1. In each power-generating element 3, the positive electrode 3a and negative electrode 3b are wound with the separator 3c interposed therebetween, whereupon the electrodes 3a and 3b are spirally wound on the winding core 9 having an elliptic cylindrical section. The winding core 9 is made of a resin having electrolytic resistance, such as polyethylene terephthalate (PET) resin.

In fabricating the aforesaid power-generating element 3, two separators 3c are pressed by a pair of rollers 10 and wound from its forward end on the winding core 4 by one turn or more. Thereafter, the positive and negative electrodes 3a and 3b are further would on the previously wound separators 3c, together with the separators 3c. Only the separators 3c are then wound one turn after winding the electrodes 3a and 3b with the separators 3c has been finished. A tape (not shown) made from polyphenyl-sulfite resin is bonded to an end of the separator 3c. Furthermore, a peripheral side face of the power-generating element 3 is covered with a sheet member 7, and an adhesive tape 8 is bonded to a terminal end of the sheet member 7. A relatively large clamping force is applied to an arc portion S (see FIG. 7) of the power-generating element 3 manufactured as described above such that the positive and negative electrodes 3a and 3b and separators 3c are dense. On the contrary, the positive and negative electrodes 3a and 3b and separators 3c are sparse in a straight portion Q.

In order to inspect influences of the shape and dimensions of a power-generating element on the cell performance, the inventors made several nonaqueous electrolytic secondary cells comprising power-generating elements having different shapes and different dimensions (major axis d, minor axis w and height h) in the above-described method. Firstly, the positive electrode 3a was made. A positive composite was made by mixing 87 wt-% lithium manganate as a positive active material, 8 wt-% polyvinylidene fluoride as a binder, and 5 wt-% acetylene black as a conductive agent. N-methyl pyrolidone was added to the positive composite to be blended into a paste. Thereafter, the paste was applied to both sides of an aluminum foil substrate having a thickness of 20 μm and a width of 155 mm, dried and rolled.

The negative electrode 3b was then made by blending 95 wt-% graphite, 2 wt-% carboxymethyl cellulose, 3 wt-% styrene-butadiene rubber (SBR) with a predetermined amount of water into a paste. The paste was applied to both sides of a copper foil substrate having a thickness of 15 μm and a width of 155 mm, dried and rolled. A band-shaped microporous polyethylene film was used for a separator 3c and had a thickness of 40 μm and a width of 152 mm. A polyethylene terephthalate (PET) resin was used for a winding core 9 and had a thickness of 100 μm and a width of 152 mm. The PET resin had a generally elliptic cylindrical section with each corner having a radius of 1 mm.

The aforesaid positive and negative electrodes 3a and 3b and separators 3c were wound on the winding core 9 so that seven types of power-generating elements were made. TABLE 1 shows different dimensions (major axis d, minor axis w, and height h) of the power-generating elements. Two power-generating elements 3 of each type were bound by a sheet member applied to peripheral side faces of the elements and were then housed into a cell case 1. Each of cell series A to G included five power-generating elements 3 differing from one another in the number T (T=0, 1, 2, 3 and 4) of turns of the separator 3c at an initial stage of the winding. Thus, 35 types of cells were made. A tension applied to the positive and negative electrodes 3a and 3b and separator 3c during the winding was constant. A polyphenyl sulfite resin having a thickness of 50 μm and a width of 152 mm was used for the sheet member. The cell case was made of a stainless steel sheet having a thickness of 1 mm by welding and had outer dimensions which were determined so that a suitable pressure was applied to each power-generating element. A rated capacity (design capacity) of each cell was set at 46 Ah and the lengths of the electrodes of each cell were adjusted so that all the cells had the same amounts of active materials held on the positive and negative electrodes respectively.

TABLE 1

| Cell series | MinorAxis w (mm) | MajorAxis d (mm) | Height h (mm) | (d-w)/w |
|---|---|---|---|---|
| A | 54.5 | 54.5 | 164 | 0 |
| B | 48.5 | 58.0 | 164 | 0.2 |
| C | 47.5 | 59.5 | 164 | 0.25 |
| D | 42.5 | 63.5 | 164 | 0.5 |
| E | 36.0 | 72.0 | 164 | 1 |
| F | 24.5 | 99.0 | 164 | 3 |
| G | 20.0 | 120.0 | 164 | 5 |

As for the electrolyte, 1 mol/lit. of $LiPE_6$ was solved in a solvent of mixture of ethylene carbonate and diethyl carbonate in the volume ratio of 1:1. The separator 3c was impregnated with a resultant solution and the cell case 1 was hermetically sealed. Thus, five types of cells each with the design capacity of 46 Ah were made.

Figure 8:
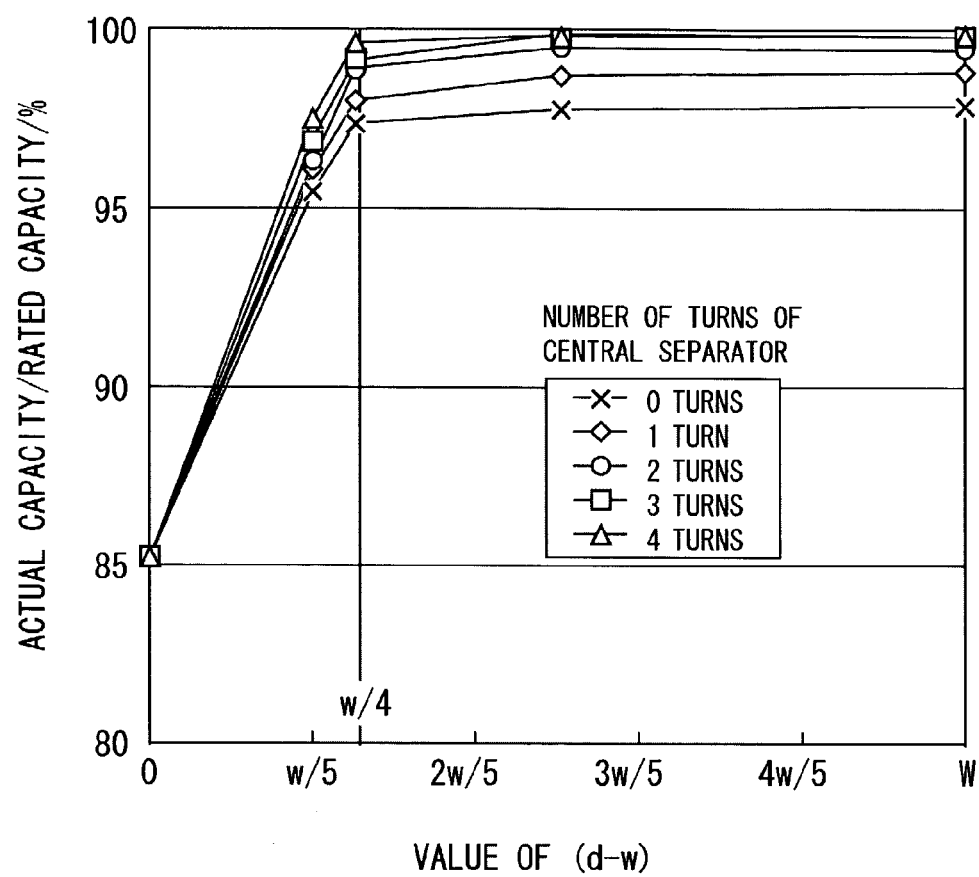
FIG. 8 is a graph showing the relationship between a dimensional parameter of the power-generating element, (d−w) and a ratio of actual capacity to rated capacity.
Figure 9:
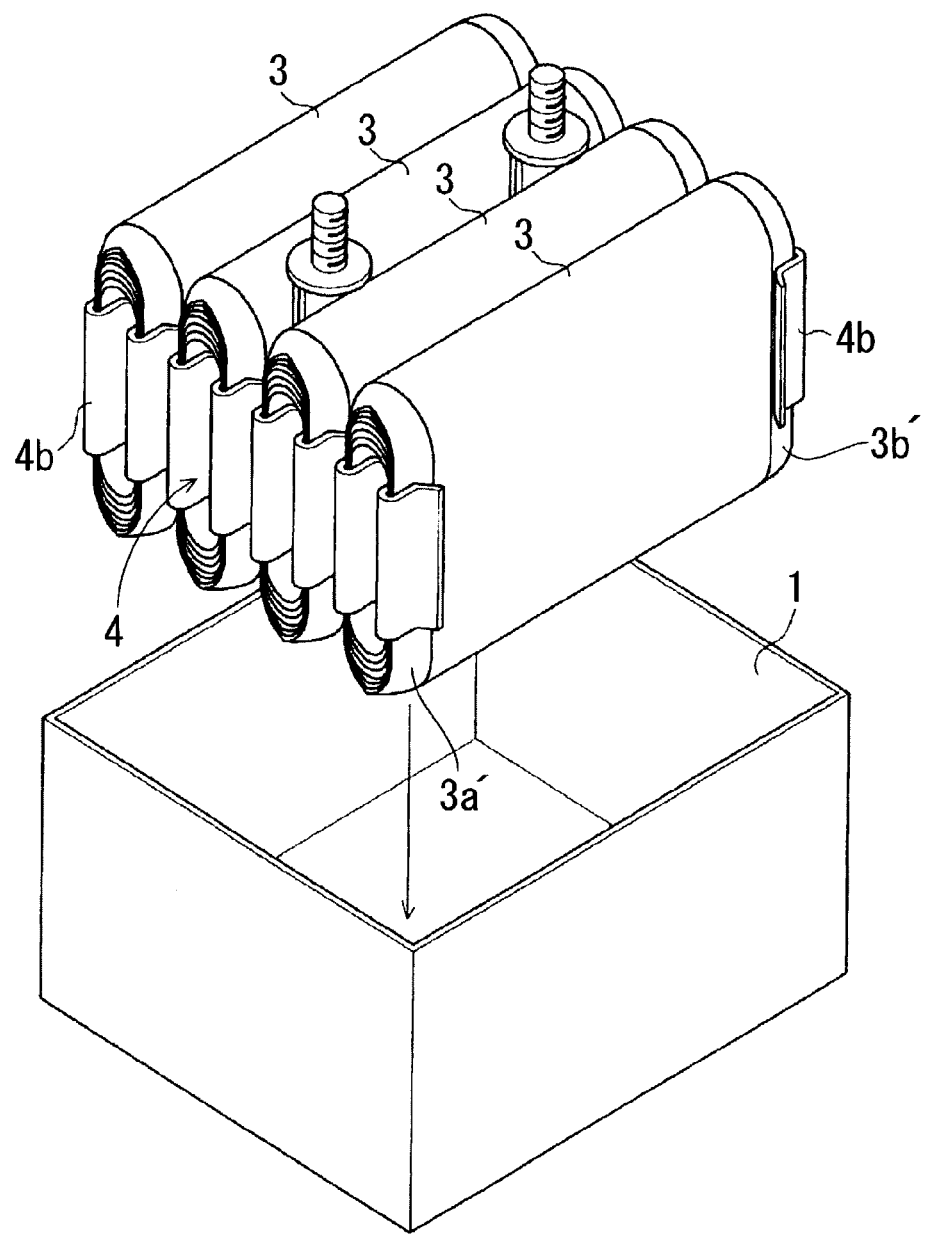
FIG. 9 is an exploded perspective view of a conventional nonaqueous electrolytic secondary cell including four power-generating elements of the elliptic cylindrical wound type.

A service or discharge capacity (actual capacity) was measured for each of the 35 cells and compared with the rated capacity. TABLE 2 and FIG. 8 show the results of measurement. The values in TABLE 2 show percentage ratios of actual capacity to rated capacity.

TABLE 2

| Cell series | Actual capacity/Rated capacity × 100 (%) | | | | |
| --- | --- | --- | --- | --- | --- |
| | T = 0 | T = 1 | T = 2 | T = 3 | T = 4 |
| A | 85.2 | 85.2 | 85.2 | 85.2 | 85.2 |
| B | 95.6 | 96.1 | 96.4 | 96.6 | 97.5 |
| C | 97.5 | 98.1 | 98.9 | 99.2 | 99.6 |
| D | 97.8 | 98.8 | 99.5 | 99.7 | 99.7 |
| E | 97.9 | 98.9 | 99.5 | 99.8 | 99.8 |
| F | 97.9 | 99.0 | 99.7 | 99.8 | 99.8 |
| G | 97.9 | 99.0 | 99.7 | 99.8 | 99.8 |

TABLE 2 and FIG. 8 show that when the length of the straight portion (d−w) is at or below 0.25w, the actual capacity is increased with an increase in the value of (d−w), and that when the value of (d−w) is above 0.25w, the actual capacity exceeds the rated capacity of 97%. Furthermore, when the value of (d−w) is above 0.25 and the number of turns of the separator at the initial stage of the winding is two or more, the actual capacity is at or above 99% of the rated capacity.

The positive and negative electrodes and separators are wound with a relatively strong fastening force in the arc portion of the power-generating element having an elliptic cylindrical section. Accordingly, a speed of the electrolyte is lower when it permeates through the positive and negative electrodes and separators into an inner part of the arc portion than when it permeates into the straight portion. As obvious from the experimental results, it is considered that when the length (d−w) of the straight portion is set to be at or above w/4, the electrolyte retained in the straight portion gradually diffuses and permeates into the arc portion such that a sufficient amount of electrolyte can be retained even in the arc portion where the positive and negative electrodes and separators are wound with a relatively strong fastening force. In other words, it is considered that an amount of electrolyte retained in the straight portion and distribution gradient of the electrolyte affect the speed at which the electrolyte diffuses and permeates into the arc portion. With an increase in the length of the straight portion, an amount of electrolyte retained in the straight portion is increased and the distribution gradient of the electrolyte is also increased.

When the value of (d−w) exceeds 10w, the electrolyte retaining performance is the same as that when the value of (d−w) is at or below 10w. Moreover, it is difficult to wind the electrodes and separators when the value of (d−w) exceeds 10w. Further, when the value of (d−w) is large, the interelectrode distance between the positive and negative electrodes is increased in the central peripheral flat portion of the power-generating element even if the peripheral side face of the power-generating element is bound by the sheet member. As a result, it is preferable that the value of (d−w) should be at or below 5w.

The diffusion and penetration of electrolyte is enhanced in a circumferential portion when the penetration of electrolyte is promoted in an innermost circumferential portion R of the power-generating element 3 wound on the winding core 9. Accordingly, it is effective to cover the portion R with the separators 3c first, whereby an axial penetration degree of electrolyte can be uniform. More specifically, it is preferable that the positive and negative electrodes should be wound with the separator interposed therebetween after only the separator has been wound together one turn or more at the initial stage of the winding. Further, it is more preferable that only the separator should be wound two turns or more at the initial stage of the winding. The reason for this is that a sufficient amount of electrolyte penetrates into the innermost circumferential portion when the innermost circumferential portion is covered with the separator first and therefore, an axial penetration degree of electrolyte can be uniformed.

The charge and discharge cycle test was carried out for a large-size nonaqueous electrolytic secondary cell of the above-described cell series F (T=2). As a result, even when the charge and discharge were repeated 500 cycles, the discharge capacity of the cell only dropped 20%. Thus, the aforesaid large-size nonaqueous electrolytic secondary cell revealed the similar cycle life characteristic to that of the small-size cell having a capacity of 1 Ah. Thus, when the peripheral side face of the power-generating element is bound by the sheet member even in the nonaqueous electrolytic secondary cell comprising the above-described large-size power-generating elements, the interelectrode distance between the positive and negative electrodes is not changed even by repeated charge and discharge and the electrolyte is retained in the uniform state in the electrodes and separators, whereupon a fine cycle life characteristic can be achieved.

Further, a sudden capacity drop is not found in the changes in the discharge capacity with a repeated charge and discharge cycle. The reason for this is that no tiny short-circuit is caused when the power-generating element is housed into the cell case. Conventionally, pieces of fallen active material and broken pieces of the current collector adhere to the positive or negative electrode during the repeated charge and discharge, resulting in the tiny short-circuit. Furthermore, since the peripheral side face of the power-generating element is bound by the sheet member and the substrate end of the arc portion of the power-generating element is bent, the active materials can be prevented from falling off from the positive and negative electrodes and the current collectors can be prevented from being broken.

In the first embodiment, two power-generating elements 3 are bound in their pressed state by the sheet member 7. Accordingly, the power-generating elements are clamped while the peripheral side flat portions of the power-generating elements are sufficiently pushed against each other. Consequently, the flat portions can be reliably prevented from swelling. However, the aforesaid pressing step can be eliminated when the two power-generating elements 3 are bound so tight that the flat portions sufficiently press each other. Moreover, two sheet members 7 are disposed over and below the power-generating elements and are fixed together at both ends of the power-generating elements because the flat portions of both ends are pressed by a pressing machine. When the pressing step is eliminated, the peripheral side faces of two power-generating elements are covered with a single sheet member 7, which can then be fixed at a suitable location on the peripheral side face of the power-generating element.

Furthermore, the sheet member 7 has a width that is slightly smaller than the height of the power-generating element 3 in the first embodiment. However, for example, the sheet member 7 may have such a width as to cover only the central portion of the peripheral side face of the power-generating element. Further, a plurality of sheet members 7 each having a small width may cover a plurality of portions of the power-generating element. Moreover, when the sheet member 7 having the small width as described above is used, the flat portions at both ends of each power-generating element 3 include portions that are uncovered with the sheet member 7, respectively. Accordingly, when only the uncovered portions are pressed by a pressing machine, the overall peripheral side faces of the power-generating elements can be covered with only a single sheet member 7.

Two power-generating elements 3 are covered with the sheet member 7 in the first embodiment. However, three or more power-generating elements 3 may instead be covered with the sheet member. For example, four power-generating elements 3 can be covered with the sheet member 7 into a bundle.

A part of the current collector 4 is held between two pairs of power-generating elements 3 in the first embodiment. For this purpose, the number of power-generating elements covered with a sheet member 7 is two. However, any construction may be employed for the current collector 4 connecting between the power-generating element 3 and the terminal 6. When the current collector 4 does not need to be held between the power-generating elements 3, four power-generating elements 3 can be covered with a sheet member 7 into a bundle. Furthermore, a connection between the power-generating element 3 and the terminal 6 can be achieved without using the current collector 4.

The positive and negative electrodes are wound into an elliptic cylindrical shape in the first embodiment. As a result, the substrate edges are located at both ends of the wound electrodes. However, the arrangement of the power-generating element 3 should not be limited when the element is of the elliptic cylindrical wound type. More specifically, the electrodes may or may not be elliptic cylindrical during winding. After the electrodes have been wound into a cylindrical shape, the cylinder may be pressed at both sides thereof so as to be formed into the elliptic cylindrical shape. Additionally, until a plurality of power-generating elements 3 are covered with the sheet member 7, a section of each power-generating element perpendicular to a winding axis may be elliptic or of another shape but not elliptic cylindrical.

The substrate edges 3a' and 3b' located at the end faces of the power-generating element 3 are put between the paired electrode collectors 4b of the current collector 4 to be connected in the second embodiment. The shape of the current collector 4 should not be limited to the one described above with reference to the drawings. The connecting structure between the electrodes 3 and 3b and the current collector 4 should not be limited to the one described above with reference to the drawings.

Furthermore, if current collection is possible with active materials being applied to the respective electrodes, the current collectors 4 may be connected to the electrodes 3a and 3b to which the active materials have been applied. The current collectors 4 may be connected to electrodes 3a and 3b both using no current collectors.

The present invention is applied to a nonaqueous electrolytic secondary cell in each embodiment. However, the present invention may be applied to other types of secondary cells or primary cells when two or more power-generating elements 3 of the wound type are used. Thus, the present invention maybe applied to every type of cell.

An overall peripheral end of each substrate edge 3a', 3b' or a part of the peripheral end thereof can be bent in a nonaqueous electrolytic secondary cell including one or more power-generating elements. Thus, the present invention can be applied to substantially all the types of cells including a wound type power-generating element 3. For example, the power-generating element may be of cylindrical wound type or of another type. Thus, the present invention should not be limited in the type of a cell and the shape of a wound power-generating element 3.

The foregoing description and drawings are merely illustrative of the present invention and are not to be construed in a limiting sense. Various changes and modifications will become apparent to those of ordinary skill in the art. All such changes and modifications are seen to fall into the scope of the present invention as defined by the appended claims.

The invention claimed is:

1. A method for producing a cell including a plurality of power-generating elements which are each in the form of an elliptic cylinder having a flat portion, wherein each of the plurality of power-generating elements includes a positive electrode and a negative electrode, said method comprising:

forming each of the power-generating elements by winding the positive electrode and the negative electrode with a separator being interposed between the positive electrode and the negative electrode;

superposing the flat portion of each of the plurality of power-generating elements on the flat portion of an adjacent one of the plurality of power-generating elements;

placing a first sheet member on an outermost flat portion of one of the plurality of power-generating elements, and placing a second sheet member on an outermost flat portion of another one of the plurality of power-generating elements on which the one of the plurality of power-generating elements is superposed;

pressing the first sheet member, the plurality of power-generating elements and the second sheet member; and joining the first sheet member to the second sheet member while the first sheet member, the plurality of power-generating elements and the second sheet member are pressed in said pressing.

2. The method according to claim 1, wherein the first sheet member and the second sheet member comprise a synthetic resin, cloth, unwoven cloth or paper.

3. The method according to claim 1, wherein a tape provided with an adhesive agent is used for joining the first sheet member to the second sheet member.

4. The method according to claim 1, wherein:

the positive electrode of each of the plurality of power-generating elements comprises a positive substrate edge located at one end of the power-generating element, and the negative electrode of each of the plurality of power-generating elements comprises a negative substrate edge located at another end of the power-generating element;

at least one of the positive substrate edge and the negative substrate edge is bent so as to be close with a central winding axis; and the central winding axis is an imaginary axis with which the positive electrode and the negative electrode are wound.

5. The method according to claim 1, wherein a relationship of $w/4 \leq d-w \leq 10w$ is met in each of the power-generating elements, where d is a major axis of a cross-sectional ellipse in each of the power-generating elements, and w is a minor axis of a cross-sectional ellipse in each of the power-generating elements.

6. The method according to claim 1, wherein:

the cell comprises a core; and said forming each of the power-generating elements comprises winding the separator singly around the core two or more turns, and winding the positive electrode and the negative electrode with the separator being interposed therebetween on the separator wound around the core.

* * * * *